US012732128B2

(12) United States Patent
Wissmach et al.

(10) Patent No.: US 12,732,128 B2
(45) Date of Patent: Sep. 8, 2026

(54) MAINS-OPERABLE POWER TOOL

(71) Applicant: Hilti Aktiengesellschaft, Schaan (LI)

(72) Inventors: Walter Wissmach, Munich (DE); Christian Augustin, Pöttmes (DE); Anton Kidess, Landsberg am Lech (DE); Markus Scherbaum, Gennach (DE); Justus Freischle, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 187 days.

(21) Appl. No.: 18/702,661

(22) PCT Filed: Oct. 26, 2022

(86) PCT No.: PCT/EP2022/079901
§ 371 (c)(1),
(2) Date: Apr. 18, 2024

(87) PCT Pub. No.: WO2023/083615
PCT Pub. Date: May 19, 2023

(65) Prior Publication Data

US 2024/0413778 A1 Dec. 12, 2024

(30) Foreign Application Priority Data

Nov. 9, 2021 (EP) .................................... 21207172

(51) Int. Cl.
*H02M 5/42* (2006.01)
*B25F 5/00* (2006.01)
*H02P 27/06* (2006.01)

(52) U.S. Cl.
CPC ................ *H02P 27/06* (2013.01); *B25F 5/00* (2013.01)

(58) Field of Classification Search
CPC ............ H02P 27/06; H02J 7/345; H02M 1/36
See application file for complete search history.

(56) References Cited

U.S. PATENT DOCUMENTS 10,033,323 B2 * 7/2018 Iwata ........................ H02P 6/28
2014/0003099 A1 1/2014 Dillig et al.
(Continued)

FOREIGN PATENT DOCUMENTS

EP 2523332 A1 11/2012
EP 2680421 A1 1/2014
(Continued)

OTHER PUBLICATIONS

International Search Report PCT/EP2022/079901 dated Feb. 15, 2023.

*Primary Examiner* — Muhammad S Islam
(74) *Attorney, Agent, or Firm* — Davidson Kappel LLC

(57) ABSTRACT

A mains-operable power tool having a mains connection, a rectifier connected downstream of the mains connection, and an electric motor with an upstream motor stage, wherein the rectifier and the motor stage are connected via an intermediate circuit having a smoothing capacitor connected in parallel with the rectifier and a switching branch connected in parallel with the rectifier, wherein the switching branch has an additional capacitor which can be discharged if necessary via a discharge circuit included in the intermediate circuit by a switching element included in the switching branch, wherein the intermediate circuit has a precharge circuit which is or can be used to set an offset voltage of the additional capacitor.

20 Claims, 10 Drawing Sheets

(56) References Cited

U.S. PATENT DOCUMENTS

| | | | | |
|---|---|---|---|---|
| 2020/0149279 | A1* | 5/2020 | Matsuno | B21F 15/04 |
| 2022/0231599 | A1* | 7/2022 | Geske | H02M 1/08 |
| 2023/0246559 | A1* | 8/2023 | Nakagawa | H02M 1/08<br>307/82 |

FOREIGN PATENT DOCUMENTS

| | | | |
|---|---|---|---|
| EP | 3462586 | A1 | 4/2019 |
| EP | 3235118 | B1 | 10/2020 |

* cited by examiner

Motor
Inverter
Discharge circuit
Intermediate circuit
Rectifier
S
$C_x$
$U_{Netz}$
100
37
80
90
33
35
34
31
30
20
15
10

Auxiliary voltage supply
Precharge circuit
S
C_zus
C_zk
30
31
34
35
40

Discharge circuit
Precharge circuit
C zus

MAINS-OPERABLE POWER TOOL

The present invention relates to a mains-operable power tool having a mains connection, a rectifier connected downstream of the mains connection, and an electric motor with an upstream motor stage. The rectifier and the motor stage are connected via an intermediate circuit having a smoothing capacitor connected in parallel with the rectifier and a switching branch connected in parallel with the rectifier. The switching branch has an additional capacitor which can be discharged if necessary via a discharge circuit included in the intermediate circuit by means of a switching element included in the switching branch.

BACKGROUND

Power tools of the type mentioned at the beginning are known in principle from the prior art. EP 3 235 118 B1 discloses a power tool having a switching path which includes an auxiliary capacitor connected in series with a switch.

SUMMARY OF THE INVENTION

The object of the present invention is to provide a power tool, the intermediate circuit of which provides the basis for an optimum charging behavior of the additional capacitor. The object is achieved by virtue of the fact that the intermediate circuit has a precharge circuit which is or can be used to set an offset voltage of the additional capacitor.

The invention includes the knowledge that the ability of the additional capacitor to store energy depends not only on the capacitance but on its initial state of charge. If a particular capacitor voltage $U_{max}$ is not intended to be exceeded, the energy to be stored must not be greater than:

$$\Delta W_{max} = \frac{1}{2}C\left(U_0^2 - U_{max}^2\right)$$

where C is the capacitance and $U_0$ is the capacitor voltage before the storage operation (offset voltage). The greater the offset voltage, the smaller the energy that can be received by the additional capacitor. If the offset voltage is equal to the maximum voltage, no more energy can be received by the additional capacitor.

As a result of the fact that, according to the invention, the intermediate circuit has a precharge circuit which is or can be used to set an offset voltage of the additional capacitor, the basis for an optimum charging behavior of the additional capacitor is provided. In this case, an optimum charging behavior—in particular with regard to the power tool as an overall system—is not necessarily provided when the offset voltage is minimal, for example equal to or less than an intermediate circuit voltage. Rather, as a result of the precharge circuit provided according to the invention, it can be ensured (or at least facilitated) that, in the sense of the above-mentioned equation, the offset voltage is low enough to be able to receive sufficient energy and is high enough to be able to supply an auxiliary voltage supply of the power tool, in particular permanently. It has been found to be advantageous if the precharge circuit is in the form of a precharging circuit.

In one particularly preferred configuration, the discharge circuit is part of an auxiliary voltage supply of the power tool. It has been found to be advantageous if the auxiliary voltage supply is connected in parallel with the additional capacitor.

In a further particularly preferred configuration, the intermediate circuit is configured in such a manner that the offset voltage is matched to an energy requirement of the auxiliary voltage supply by means of the precharge circuit. It has been found to be advantageous if the offset voltage is regulated or controlled by means of the precharge circuit on the basis of a characteristic variable which characterizes a mains voltage applied to the mains connection. The characteristic variable may be a voltage potential, a frequency and/or a phase angle of the mains voltage. The precharge circuit may have a control input and/or a regulating input. It has been found to be advantageous if the control input and/or the regulating input is/are signal-connected to a microcontroller included in the power tool.

It has been found to be advantageous if the precharge circuit has a resistor network or is formed by a resistor network. The precharge circuit may have a resistor network and/or a Zener diode. It has been found to be advantageous if the precharge circuit has a regulating means, in particular in the form of a series regulator. In a further particularly preferred configuration, the precharge circuit is connected, on the one hand, in parallel with the additional capacitor. On the other hand, the precharge circuit may be fed via a precharge connection point which is preferably in series between the smoothing capacitor and the switching element.

In one particularly preferred configuration, the switching element is designed to automatically switch and is, in particular, in the form of a DIAC, a SIDACtor, a TVS thyristor, a DIAC/TRIAC combination or a spark gap. The switching element may have or be composed of one or more elements of this type. In a further particularly preferred configuration, the switching element is designed to actively switch and is, in particular, in the form of a MOSFET, an IGBT, a thyristor or a TRIAC. The switching element may have or be composed of one or more elements of this type. It has been found to be advantageous if the switching element has a switching input.

In a further particularly preferred configuration, the smoothing capacitor and/or the additional capacitor has/have a cut-off voltage of at least 600 volts. It has been found to be advantageous if the smoothing capacitor and/or the additional capacitor is/are in the form of a film capacitor. It has been found to be advantageous if the capacitance of the smoothing capacitor is less than the capacitance of the additional capacitor.

The additional capacitor may be in the form of an electrolytic capacitor which has a dielectric strength of less than 600 V and, in particular, between 400 and 450 V.

The smoothing capacitor may be a film capacitor of at least 600 V. The additional capacitor may be an electrolytic capacitor.

In one particularly preferred configuration, the motor stage has an inverter. It has been found to be advantageous if the electric motor is in the form of a three-phase motor. It has been found to be advantageous if the power tool is in the form of an electrical handheld power tool.

Further subject matter which can be protected independently specifies a mains-operable power tool having a mains connection, a rectifier connected downstream of the mains connection, and an electric motor with an upstream motor stage, wherein the rectifier and the motor stage are connected via an intermediate circuit having a smoothing capacitor connected in parallel with the rectifier and a switching branch connected in parallel with the rectifier, wherein the switching branch has an additional capacitor which can be discharged if necessary via a discharge circuit included in the intermediate circuit by means of a switching element included in the switching branch. The smoothing capacitor and/or the additional capacitor has/have a cut-off voltage of at least 600 volts.

It has been found to be advantageous if the smoothing capacitor and/or the additional capacitor is/are in the form of a film capacitor. It has been found to be advantageous if the capacitance of the smoothing capacitor is less than the capacitance of the additional capacitor.

Further subject matter which can be protected independently specifies a mains-operable power tool having a mains connection, a rectifier connected downstream of the mains connection, and an electric motor with an upstream motor stage, wherein the rectifier and the motor stage are connected via an intermediate circuit having a smoothing capacitor connected in parallel with the rectifier and a switching branch connected in parallel with the rectifier, wherein the switching branch has an additional capacitor which can be discharged if necessary via a discharge circuit included in the intermediate circuit by means of a switching element included in the switching branch. The switching element is designed to automatically switch and is, in particular, in the form of a DIAC, a SIDACtor, a TVS thyristor, a DIAC/TRIAC combination or a spark gap, or the switching element is designed to actively switch and is, in particular, in the form of a MOSFET, an IGBT, a thyristor or a TRIAC.

BRIEF DESCRIPTION OF THE DRAWINGS

Further advantages will become apparent from the following description of the figure. A particularly preferred exemplary embodiment of the present invention is depicted in the figure. The figures, the description and the claims contain numerous features in combination. A person skilled in the art will expediently also consider the features individually and combine them to form useful further combinations.

Identical and similar components are denoted by the same reference signs in the figure, in which.

DETAILED DESCRIPTION

Figure 1:
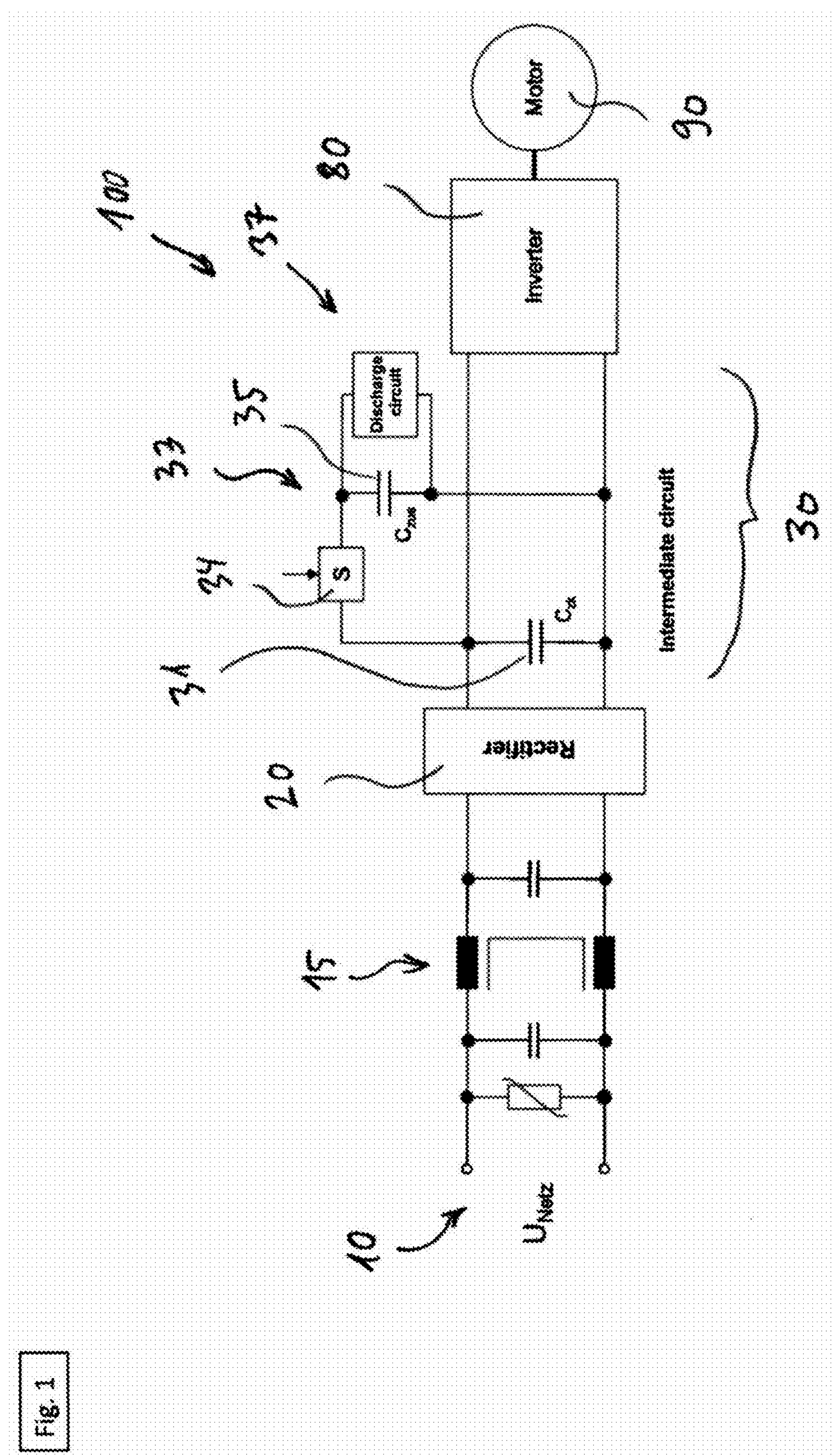
FIG. 1 shows a mains-operable power tool.

FIG. 1 shows—in a highly schematic illustration—a mains-operable power tool 100. The power tool 100 is equipped with a mains connection 10, a rectifier 20 connected downstream of the mains connection 10, and an electric motor 90 with an upstream motor stage 80. The motor stage 80 is in the form of an inverter, for example. The electric motor 90 is in the form of a three-phase motor, for example.

The rectifier 20 and the motor stage 80 are connected via an intermediate circuit 30 having a smoothing capacitor 31 connected in parallel with the rectifier 20 and a switching branch 33 connected in parallel with the rectifier 20. The switching branch 33 has an additional capacitor 35 which can be discharged if necessary via a discharge circuit 37 included in the intermediate circuit 30 by means of a switching element 34 included in the switching branch 33.

The additional capacitor 35 can be charged if necessary via the switching element 34. The discharge circuit 37 ensures that the charged additional capacitor 35 is discharged again and the initial state with the offset voltage set at the additional capacitor 35 is achieved.

The power tool 100 is connected to the AC mains via a mains filter 15, and the AC voltage $U_{Netz}$ is rectified by the rectifier 20 and is smoothed by the smoothing capacitor 31. In standby, the intermediate circuit voltage is permanently equal to a peak voltage of the mains voltage. In the case of loading, the intermediate circuit voltage substantially follows the rectified mains voltage. The additional capacitor 35 is connected to the intermediate circuit 30 via the switching element 34 (here in the form of an active element with a switching input) and can be discharged via the discharge circuit 37. The smoothing capacitor 31 and the additional capacitor 35 has/have a cut-off voltage of at least 600 volts in the present case and are in the form of film capacitors. Furthermore, the capacitance of the smoothing capacitor 31 is less than the capacitance of the additional capacitor 35.

Figure 2A:
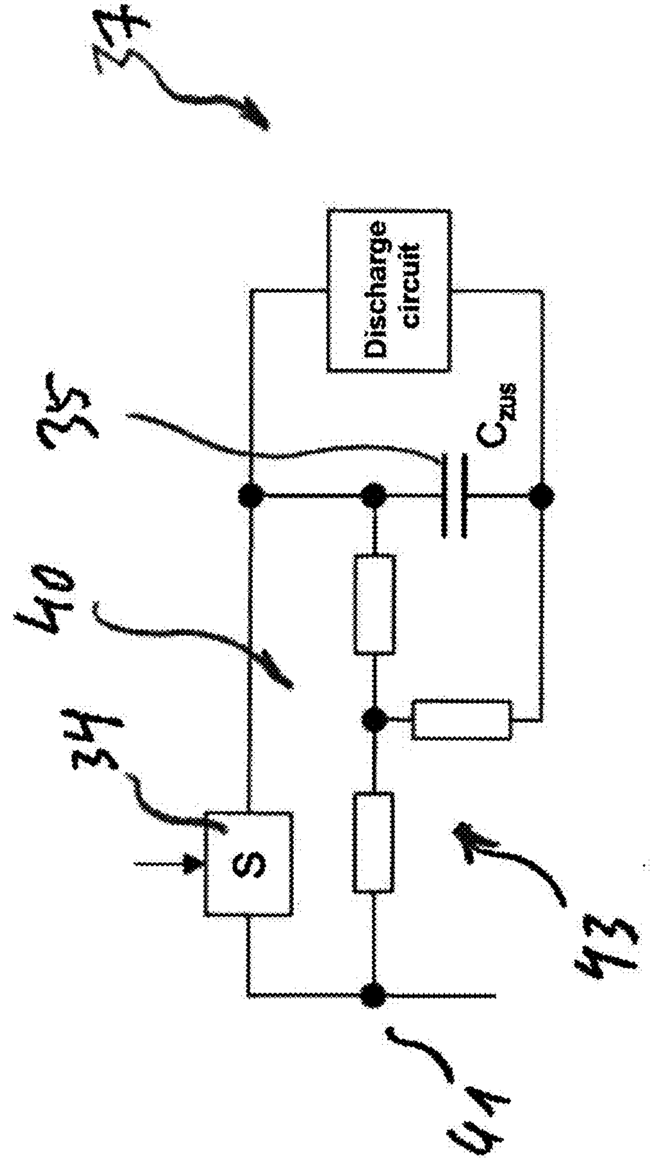
FIGS. 2*a, b, c* and *d* show an intermediate circuit with variants of the precharge circuit.
Figure 2B:
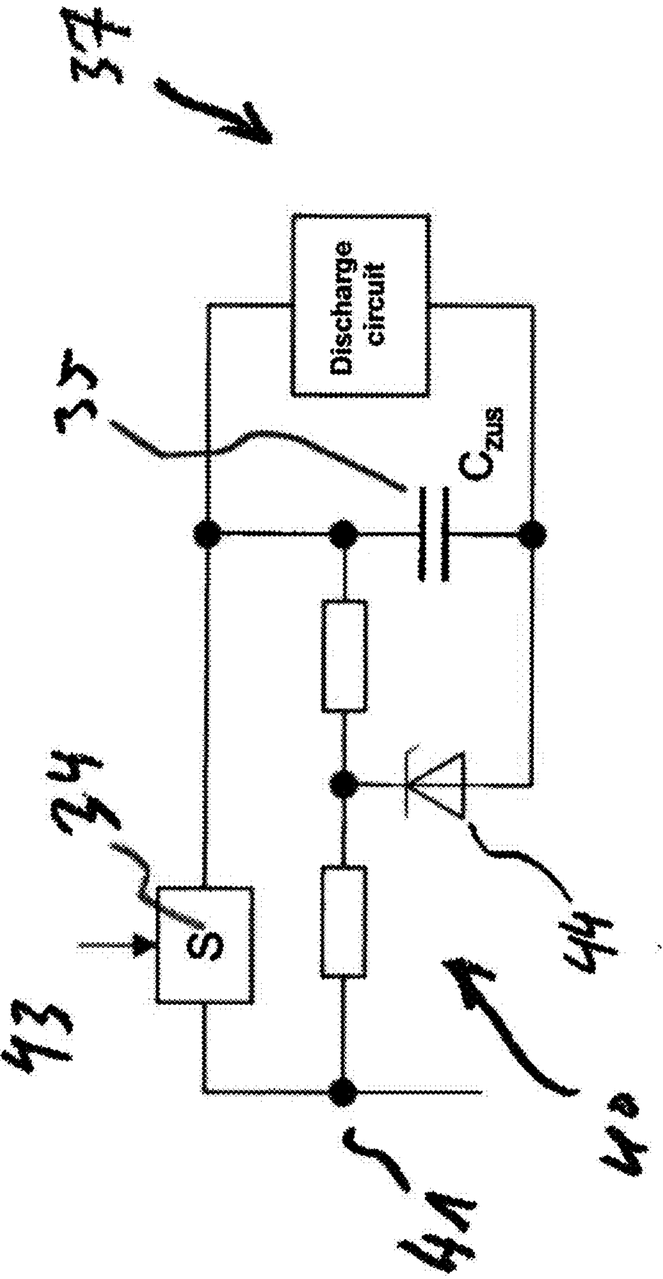
Figure 2C:
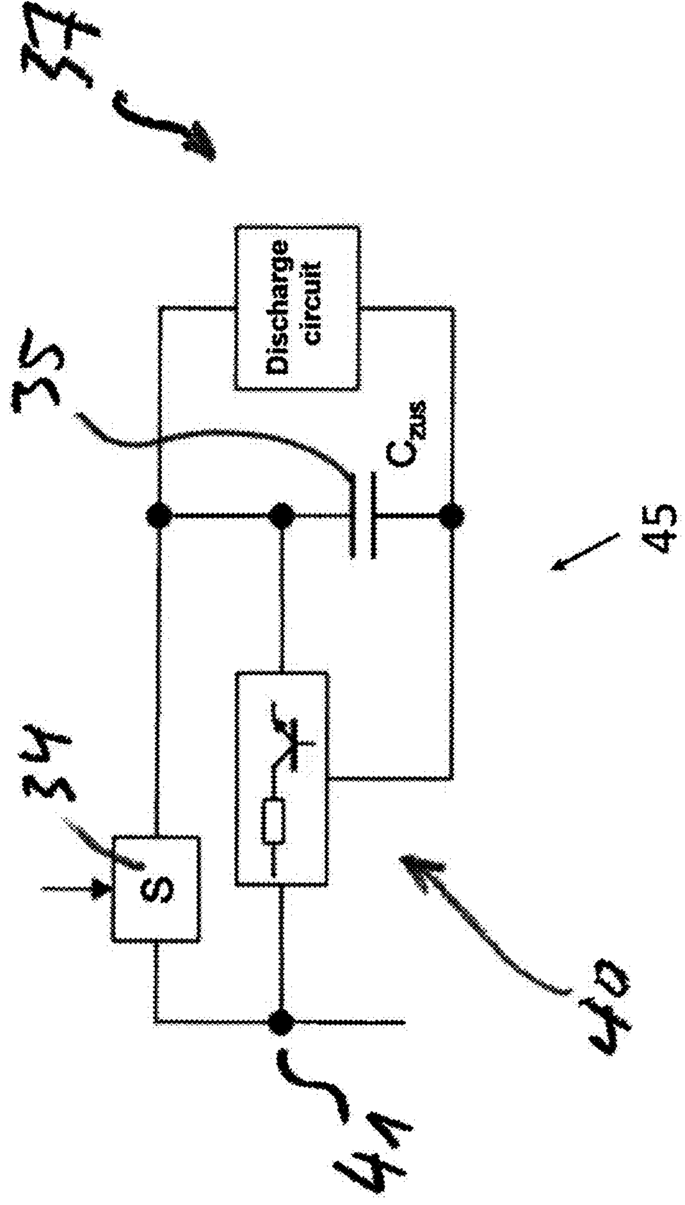
Figure 2D:
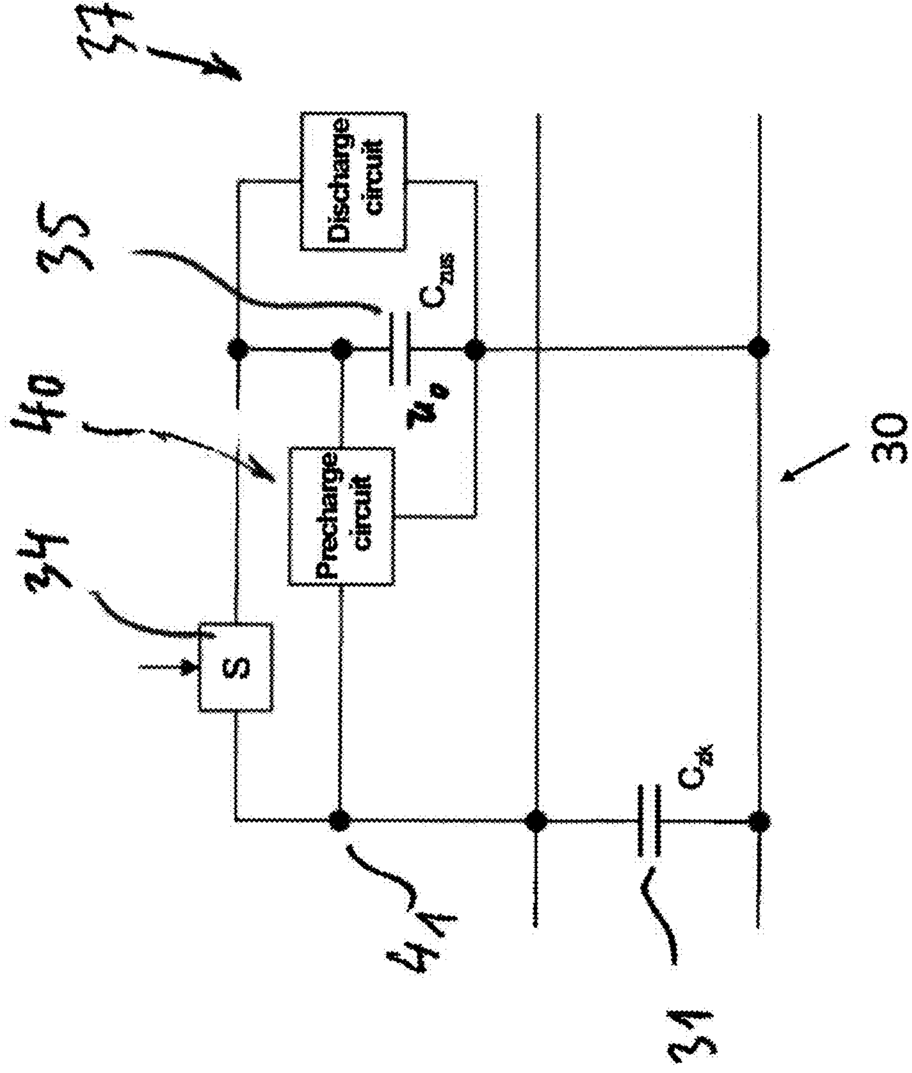

According to the invention—see FIG. 2*d*)—the intermediate circuit is equipped with a precharge circuit 40 which is or can be used to set an offset voltage $U_0$ of the additional capacitor 35. On the one hand, the precharge circuit 40 is connected in parallel with the additional capacitor 35. On the other hand, the precharge circuit 40 is fed via a precharge connection point 41 which is in series between the smoothing capacitor 31 and switching element 34. The precharge connection point 41 can also be connected in another manner, for example via an additional auxiliary rectifier, that is to say the precharging circuit is supplied via a rectified mains voltage.

The important advantage is that the voltages permanently applied to the smoothing capacitor 31 and to the additional capacitor 35 may be different. This makes it possible, on the one hand, to use capacitor types with different maximum voltages (for example film capacitors with a low capacitance but a high maximum voltage and electrolytic capacitors with a high capacitance and a lower maximum voltage).

On the other hand, the ability of the additional capacitor 35 to store energy is substantially increased if it can always be operated with a low precharge voltage, in particular, as a result of which it can have substantially smaller dimensions in terms of capacitance.

Suitably selected activation and deactivation strategies of the switching element 34 together with a variable precharge voltage, which can be conditioned by the precharge circuit 40, also allow a distinction to be made between briefly occurring and permanently applied mains overvoltages and allow the additional capacitor 35 to always be used as a store for briefly occurring voltage pulses.

An intermediate circuit 30 with variants of the precharge circuit 40 is illustrated in FIG. 2. In this case, FIG. 2 *d*) shows the already mentioned precharge circuit 40 in a general form. According to FIG. 2 *a*), the precharge circuit 40 is formed by a simple resistor network 43. This has the advantage that the precharge voltage is always a particular proportion (that can be set via the voltage divider ratio) of the intermediate circuit voltage.

According to FIG. 2 *b*), the precharge circuit 40 is equipped with a Zener diode 44. The resistor/Zener diode network illustrated in FIG. 2*b*) advantageously results in a constant precharge voltage.

FIG. 2 *c*) schematically shows a series regulator circuit 45 which allows a higher charging current. This is expedient if the additional capacitor 35 is used as a back-up capacitor for an auxiliary voltage supply 50 (cf. FIG. 3). The offset voltage $U_0$ can be regulated or controlled by means of the precharge circuit 40 on the basis of a characteristic variable which characterizes a mains voltage applied to the mains connection 10. This can take place, for example, by the precharge circuit 40 having a control input or regulating input. It is therefore possible to achieve a precharge voltage of the additional capacitor 35.

Figure 3:
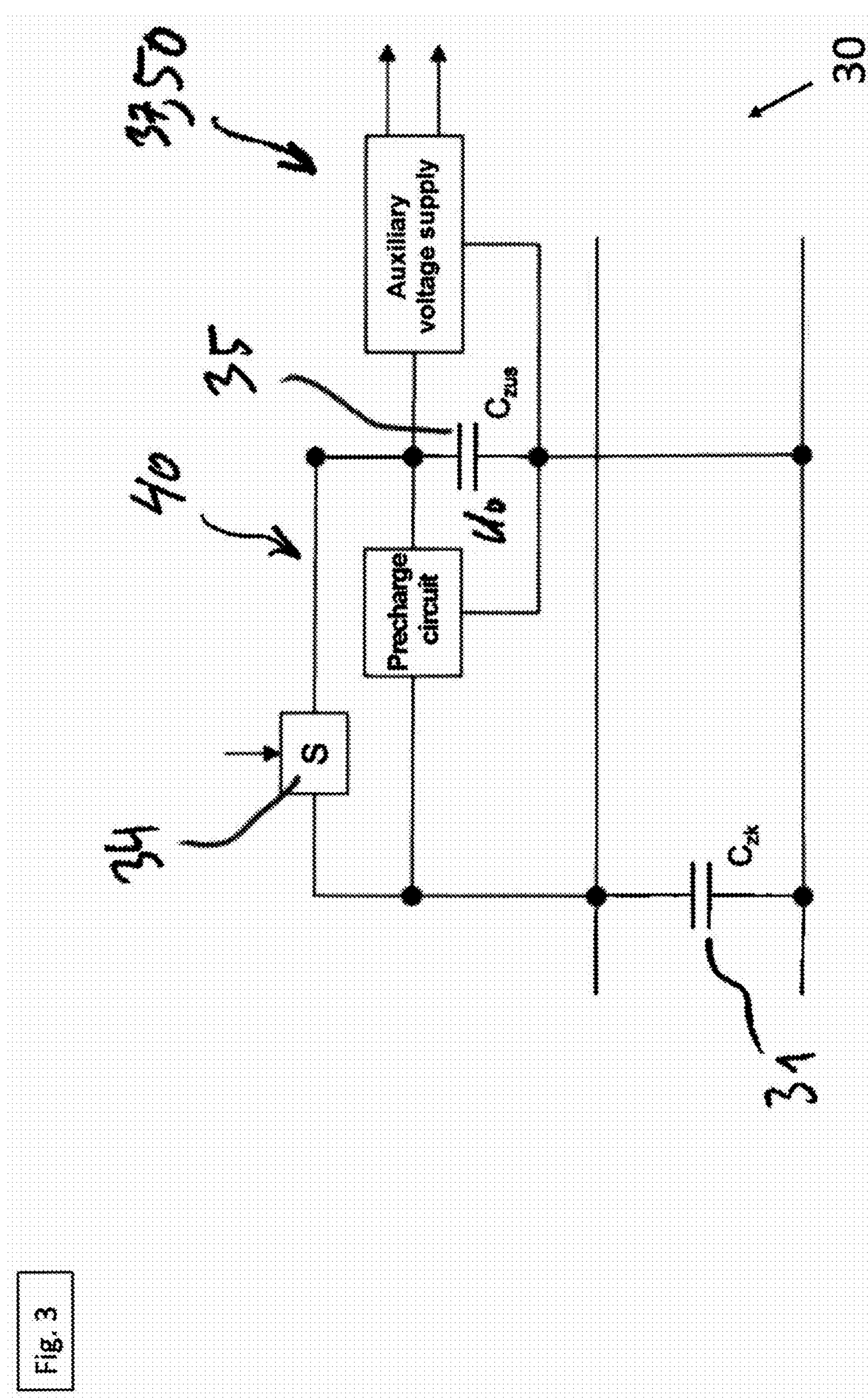
FIG. 3 shows an intermediate circuit with a precharge circuit and an auxiliary voltage supply.

An intermediate circuit 30 with a precharge circuit 40 and an auxiliary voltage supply 50 is illustrated in FIG. 3. The discharge circuit 37 is part of an auxiliary voltage supply 50 of the power tool 100. The offset voltage $U_0$ of the additional capacitor 35 can be advantageously matched to an energy requirement of the auxiliary voltage supply 50 by means of the precharge circuit 40. It can therefore be ensured (or at least facilitated) that the offset voltage $U_0$ is low enough to be able to receive sufficient energy and is high enough to supply the auxiliary voltage supply 50 of the power tool 100.

Figure 4A:
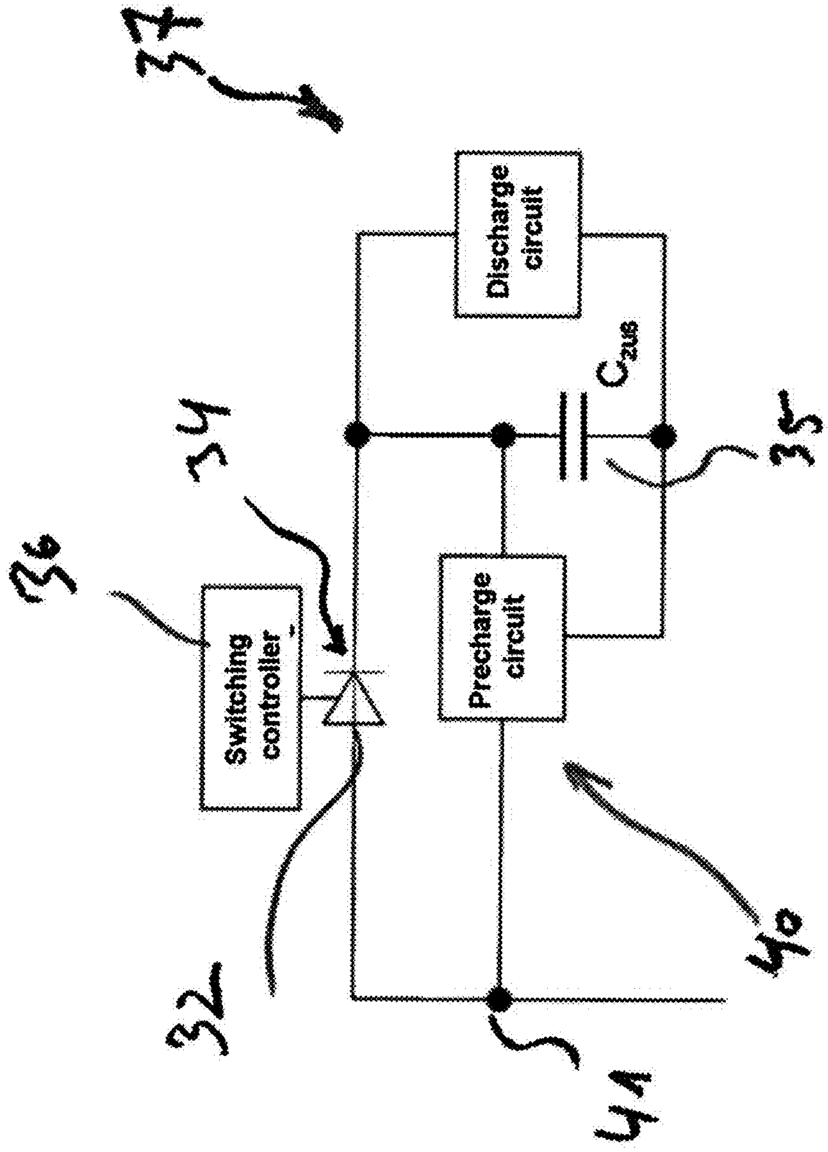
FIGS. 4*a, b, c* and *d* show an intermediate circuit with variants of the switching element.
Figure 4B:
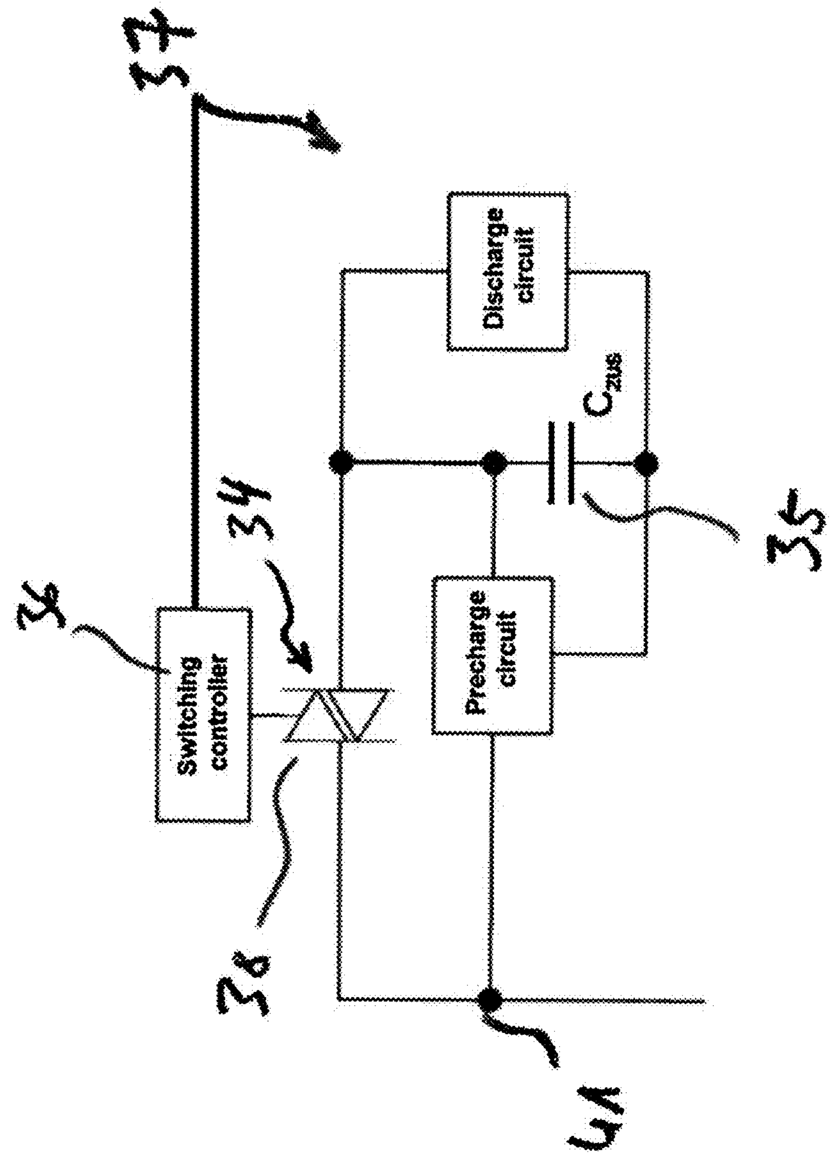
Figure 4C:
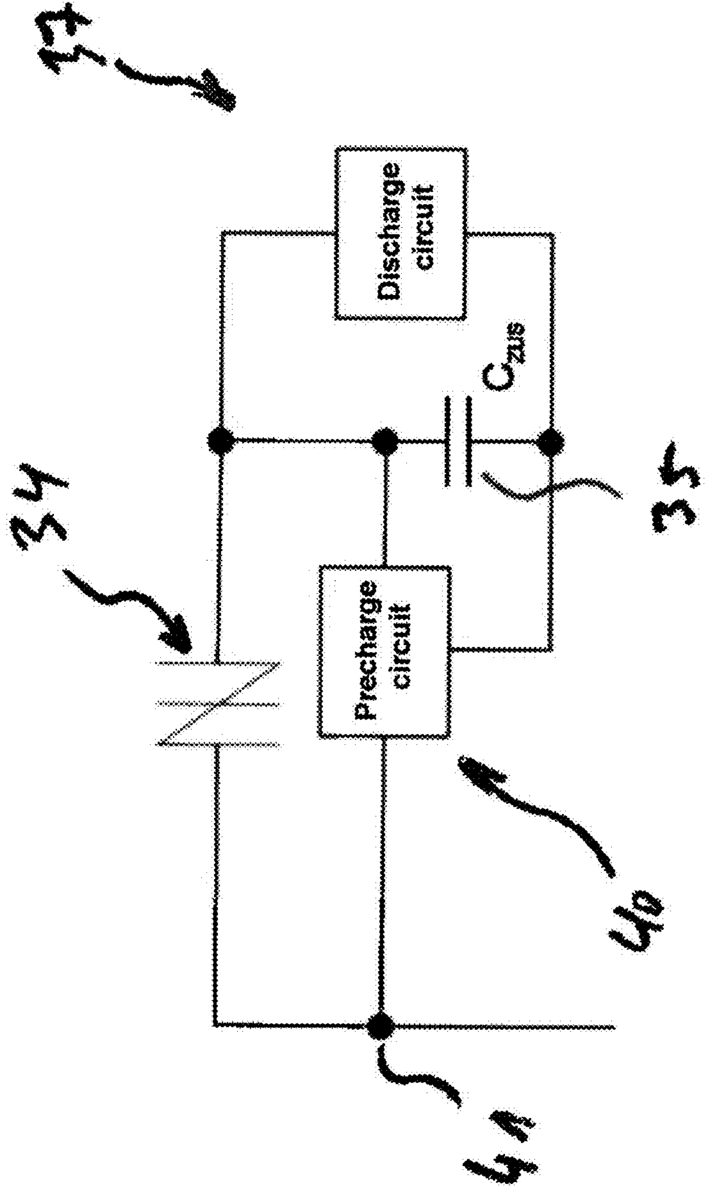
Figure 4D:
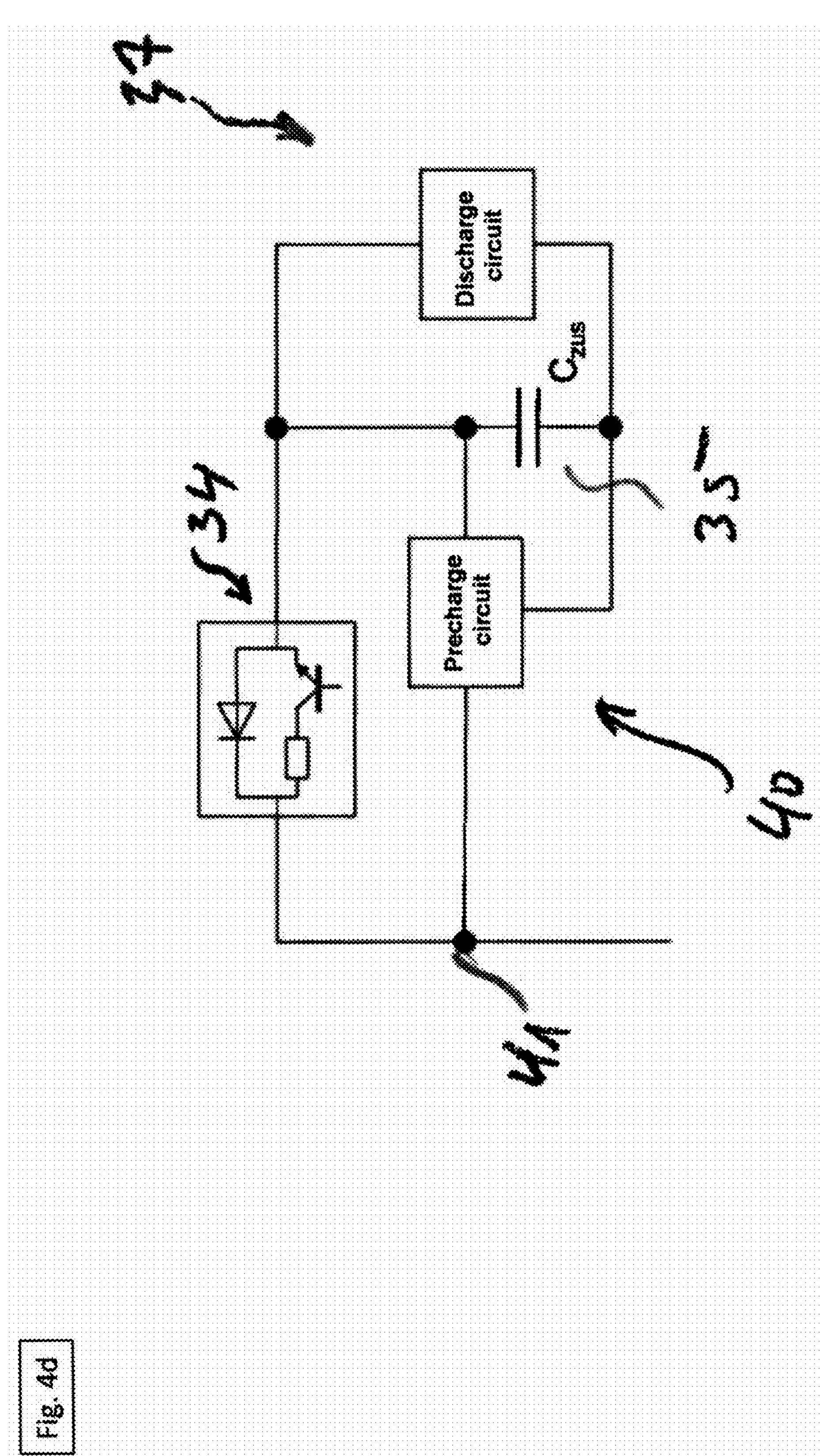

FIGS. 4*a, b, c, d* show an intermediate circuit 30 with variants of the switching element 34. The switching element 34 may be designed to actively switch and may be provided, in particular, as a MOSFET, an IGBT, a thyristor or a TRIAC. The switching element 34 may be designed to automatically switch and may be provided, in particular, as a DIAC, a SIDACtor, a TVS thyristor, a DIAC/TRIAC combination or spark gap. The configurations shown in FIG. 4 can come into effect even though the power tool is not equipped with a precharge circuit (cf. FIG. 1).

It is possible to distinguish between the controllable configurations in FIGS. 2 *a*), *b*) and *d*) and an automatically switching configuration according to FIG. 2*c*). The controllable configurations in FIGS. 2 *a*), *b*) and *d*) include those which are only actively switched on and automatically switch off. These are the configurations in FIGS. 2 *a*) and *b*) which each have an external switching controller 36. In the configuration in FIG. 2 *a*), the switching element 34 is provided as s thyristor 32. In the configuration in FIG. 2 *b*), switching element 34 is provided as a TRIAC 38. The configuration in FIG. 2 *d*) can also be actively switched off.

The configurations in FIGS. 2 *b*), *c*) and *d*) can also carry current in both directions and can therefore also actively discharge the additional capacitor 35. Controllable configurations can be modified to form quasi-automatic configurations by means of appropriate switching controllers. For example, mention may be made of a thyristor triggering controller which triggers the thyristor as soon as the applied voltage exceeds a threshold value. This would give rise to a similar switching behavior to a SIDACtor. SIDACtors, DIACs or TVS thyristors are related components which automatically trigger when a threshold voltage is exceeded, then have a very low voltage drop and turn off again only when a relatively small holding current is undershot.

LIST OF REFERENCE SIGNS

10 Mains connection
15 Mains filter
20 Rectifier
30 Intermediate circuit
31 Smoothing capacitor
32 Thyristor
33 Switching branch
34 Switching element
35 Additional capacitor
36 Switching controller
37 Discharge circuit
38 TRIAC
40 Precharge circuit
41 Precharge connection point
43 Resistor network
44 Zener diode
45 Series regulator circuit
50 Auxiliary voltage supply
80 Motor stage
90 Electric motor
100 Power tool
$U_{Netz}$ Mains voltage (AC voltage)
$U_0$ Offset voltage

What is claimed is:

1. A mains-operable power tool comprising:
a mains connection;
a rectifier connected downstream of the mains connection;
an electric motor with a motor stage facing the rectifier; and
an intermediate circuit connecting the rectifier and the motor stage, the intermediate circuit having a smoothing capacitor connected in parallel with the rectifier and a switching branch connected in parallel with the rectifier, the switching branch having an additional capacitor, a switch and a discharge circuit, the additional capacitor being dischargeable via the discharge circuit, the switch allowing charging of the additional capacitor,
the intermediate circuit having a precharge circuit useable to set an offset voltage of the additional capacitor.

2. The power tool as recited in claim 1 wherein the discharge circuit is part of an auxiliary voltage supply of the power tool.

3. The power tool as recited in claim 1 wherein the offset voltage is regulated or controlled by the precharge circuit on the basis of a mains voltage applied to the mains connection.

4. The power tool as recited in claim 1 wherein the precharge circuit has a resistor network or the precharge circuit has a Zener diode.

5. The power tool as recited in claim 1 wherein the precharge circuit has a regulator.

6. The power tool as recited in claim 1 wherein the switch is designed to automatically switch.

7. The power tool as recited in claim 1 wherein the switch is designed to actively switch.

8. The power tool as recited in claim 1 wherein the smoothing capacitor or the additional capacitor has a cut-off voltage of at least 600 volts.

9. The power tool as recited in claim 1 wherein the smoothing capacitor or the additional capacitor in the form of a film capacitor.

10. The power tool as recited in claim 1 wherein a capacitance of the smoothing capacitor is less than a capacitance of the additional capacitor.

11. The power tool as recited in claim 1 wherein the motor stage has an inverter or the electric motor is in the form of a three-phase motor.

12. The power tool as recited in claim 1 further comprising a resistor between the mains connection and the rectifier.

13. The power tool as recited in claim 1 further comprising at least one further capacitor between the mains connection and the rectifier.

14. The power tool as recited in claim 1 wherein the discharge circuit is part of an auxiliary voltage supply of the power tool and the precharge circuit has a resistor network or the precharge circuit has a Zener diode.

15. The power tool as recited in claim 2 wherein the offset voltage is matched to an energy requirement of the auxiliary voltage supply by the precharge circuit.

16. The power tool as recited in claim 5 wherein the regulator is a series regulator or a series regulating circuit.

17. The power tool as recited in claim 6 wherein the switch includes a DIAC, a SIDACtor, a TVS thyristor, a DIAC/TRIAC combination or a spark gap.

18. The power tool as recited in claim 7 wherein the switch includes a MOSFET, an IGBT, a thyristor or a TRIAC.

19. The power tool as recited in claim 13 wherein the at least one further capacitor includes two further capacitors.

20. The power tool as recited in claim 19 further comprising a resistor located between the two further capacitors.

* * * * *